(12) United States Patent
Kim et al.

(10) Patent No.: US 12,629,561 B2
(45) Date of Patent: May 19, 2026

(54) APPARATUS AND METHOD FOR COUNTING REPETITIVE MOVEMENT BASED ON ARTIFICIAL INTELLIGENCE

(71) Applicant: ELECTRONICS AND TELECOMMUNICATIONS RESEARCH INSTITUTE, Daejeon (KR)

(72) Inventors: Do-Hyung Kim, Daejeon (KR); Jae-Hong Kim, Daejeon (KR); Young-Woo Yoon, Daejeon (KR); Ho-Beom Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 315 days.

(21) Appl. No.: 18/429,599

(22) Filed: Feb. 1, 2024

(65) Prior Publication Data

US 2025/0065188 A1 Feb. 27, 2025

(30) Foreign Application Priority Data

Aug. 22, 2023 (KR) ......................... 10-2023-0110108

(51) Int. Cl.
*A63B 24/00* (2006.01)
*A63B 71/06* (2006.01)
(Continued)

(52) U.S. Cl.
CPC ...... *A63B 24/0006* (2013.01); *A63B 71/0622* (2013.01); *G06V 10/751* (2022.01);
(Continued)

(58) Field of Classification Search
CPC ......... A63B 24/0006; A63B 2024/0009–0015; A63B 2220/17; G06V 40/10; G06V 10/751; G06V 40/23–25
See application file for complete search history.

(56) References Cited

U.S. PATENT DOCUMENTS 4,891,748 A 1/1990 Mann
8,696,126 B2 4/2014 Yoo et al.
(Continued)

FOREIGN PATENT DOCUMENTS

KR 10-2016-0096473 A 8/2016
KR 10-1716375 B1 3/2017
(Continued)

*Primary Examiner* — Raphael Schwartz
(74) *Attorney, Agent, or Firm* — LRK PATENT LAW FIRM

(57) ABSTRACT

Disclosed herein is an apparatus and method for counting repetitive movements based on Artificial Intelligence. The method may include generating standard movement information that includes a key pose extracted from a demonstration movement image stream based on human skeleton information, which is a set of pieces of positional information of human joints, and major joint information in the key pose and counting repetitive movements depending on whether a user movement matches the standard movement information based on human skeleton information of a user movement image stream.

12 Claims, 7 Drawing Sheets

<TIME-SERIES DEMONSTRATION MOVEMENT DATA(VIDEO)> <KEY POSE 1> <KEY POSE 2> <KEY POSE 3> <KEY POSE 4>

(51) Int. Cl.
 *G06V 10/75*   (2022.01)
 *G06V 40/10*   (2022.01)
 *G06V 40/20*   (2022.01)

(52) U.S. Cl.
 CPC .............. *G06V 40/10* (2022.01); *G06V 40/23* (2022.01); *A63B 2024/0015* (2013.01); *A63B 2220/17* (2013.01); *A63B 2220/20* (2013.01); *A63B 2220/806* (2013.01); *A63B 2230/62* (2013.01)

(56)    References Cited

U.S. PATENT DOCUMENTS

| | | | |
|---|---|---|---|
| 9,350,951 B1* | 5/2016 | Rowe | G06T 7/66 |
| 9,690,981 B2 | 6/2017 | Baek et al. | |
| 9,981,193 B2 | 5/2018 | Adams et al. | |
| 10,755,466 B2 | 8/2020 | Chamdani et al. | |
| 10,776,979 B2 | 9/2020 | Callegari et al. | |
| 11,182,946 B2 | 11/2021 | Garofalo et al. | |
| 11,282,298 B2 | 3/2022 | Mehl et al. | |
| 11,482,047 B2 | 10/2022 | Mehl et al. | |
| 2015/0100141 A1* | 4/2015 | Hughes | G06Q 10/0639 700/92 |
| 2016/0129335 A1* | 5/2016 | Domansky | G06V 40/25 348/77 |
| 2017/0112418 A1 | 4/2017 | Comeau et al. | |
| 2020/0105041 A1 | 4/2020 | Garofalo et al. | |
| 2020/0306587 A1 | 10/2020 | Jabr | |
| 2021/0016150 A1 | 1/2021 | Jeong et al. | |
| 2022/0105389 A1 | 4/2022 | Lianides et al. | |
| 2023/0401736 A1 | 12/2023 | Lee et al. | |

FOREIGN PATENT DOCUMENTS

| | | | |
|---|---|---|---|
| KR | 10-2017-0057005 A | 5/2017 | |
| KR | 10-1818198 B1 | 1/2018 | |
| KR | 10-1936692 B1 | 1/2019 | |
| KR | 10-1959079 B1 | 3/2019 | |
| KR | 10-1970687 B1 | 4/2019 | |
| KR | 10-2031243 B1 | 10/2019 | |
| KR | 10-2226927 B1 | 3/2021 | |
| KR | 10-2292415 B1 | 8/2021 | |
| KR | 10-2331890 B1 | 11/2021 | |
| KR | 10-2412553 B1 | 6/2022 | |
| KR | 10-2022-0123885 A | 9/2022 | |
| KR | 10-2022-0131661 A | 9/2022 | |
| KR | 10-2472086 B1 | 11/2022 | |
| KR | 10-2495047 B1 | 2/2023 | |
| KR | 10-2023-0086874 A | 6/2023 | |

* cited by examiner

<TIME-SERIES DEMONSTRATION   <KEY POSE 1>   <KEY POSE 2>   <KEY POSE 3>   <KEY POSE 4>
MOVEMENT DATA(VIDEO)>

<ANCHOR POSE>        <CANDIDATE POSE>        <OVERLAP OF BODY SEGMENTS
OF TWO POSES>

<KEY POSE 1>        <KEY POSE 2>        <KEY POSE 3>        <KEY POSE 4>

<KEY POSE 2>  <KEY POSE 3>

<TIME PREV>  <TIME CUR>

APPARATUS AND METHOD FOR COUNTING REPETITIVE MOVEMENT BASED ON ARTIFICIAL INTELLIGENCE

CROSS REFERENCE TO RELATED APPLICATION

This application claims the benefit of Korean Patent Application No. 10-2023-0110108, filed Aug. 22, 2023, which is hereby incorporated by reference in its entirety into this application.

BACKGROUND OF THE INVENTION

1. Technical Field

The disclosed embodiment relates to technology for coaching for human exercise movements such as fitness, yoga, stretching, and the like by analyzing and evaluating the human exercise movements captured using a camera based on Artificial Intelligence (AI).

2. Description of Related Art

With the advent of the era of 'Singlization', where the number of single-person households is approaching 10 million, 'home workout', which indicates doing workouts alone at home while watching video on a TV or a smartphone, has become a trend.

Recently, commercial products that analyze exercise postures of a learner input through a camera and evaluate and correct the postures in real time using Artificial Intelligence (AI) technology have been launched. AI coaching services based on such movement evaluation are expected to spread to various fields, such as professional sports, medical rehabilitation, and the like as well as fitness and diet, and the related healthcare market is expected to rapidly grow.

The commercial products that provide AI fitness coaching based on image analysis should have two key functions: a function of counting the number of times a user repeats a fitness movement and a function of providing a quantitative evaluation score for the movement and posture of the user.

However, these functions do not operate independently of each other. In other words, when a user repeats a specific fitness movement, commercial products generally count the movement as a repetitive movement only when the user correctly performs the movement, that is, only when the quantitative evaluation score is high. Also, they provide a quantitative evaluation result only for the counted movement.

Also, most existing commercial products use either a deep-learning method or a heuristic method in order to count repetitive movements. However, these existing methods have the following limitations.

First, because the deep-learning-based counting method is based on supervised deep-learning, there is a problem in which significant amounts of training datasets for different postures and pretraining are required for counting movements.

For example, Google's MediaPipe Pose requires hundreds of images for each different posture in order to implement a function of counting repetitive movements. Generally, deep-learning techniques require collection of datasets about various people, environments, postures, and the like in order to ensure stable performance, and the cost of collecting such datasets is significant. Furthermore, large amounts of datasets pertaining to different postures for each fitness movement have to be secured, and a deep-learning model has to be trained with the secured datasets, so there is a great disadvantage in terms of scalability.

The heuristic-based counting method depends on the experience and knowledge of professional fitness trainers, and has a problem in which a person must manually set an angle formed by major segments for each different posture of a standard movement in order to count movements.

That is, because the heuristic-based method depends on the prior knowledge of people, there is a problem of lack of consistency in defining correct postures. Also, because an angle formed by segments has to be set for each different posture of each fitness movement, there is a scalability problem as in the deep-learning-based counting method.

SUMMARY OF THE INVENTION

An object of the disclosed embodiment is to solve problems of the cost and effort for performing training for which collecting large amounts of training datasets in advance is required in order to train a deep-learning model for counting repetitive movements.

Another object of the disclosed embodiment is to solve problems of manpower and uncertainty that are caused by manually setting in advance angles formed by major segments in each standard posture that is a criterion for counting repetitive movements.

An apparatus for counting repetitive movements based on AI according to an embodiment includes memory in which at least one program is recorded and a processor for executing the program. The program may generate standard movement information including a key pose extracted from a demonstration movement image stream based on human skeleton information, which is a set of pieces of positional information of human joints, and major joint information in the key pose, and may count repetitive movements depending on whether a user movement matches the standard movement information based on human skeleton information of a user movement image stream.

Here, when it detects the key pose, the program may extract a candidate pose, the distance of which from an anchor pose, which is a ready position, is equal to or greater than an upper limit threshold or is equal to or less than a lower limit threshold, as the key pose.

Here, when it calculates the distance, the program may calculate the distance based on a proportion of a pixel area in which a body segment of the candidate pose and a body segment of the anchor pose do not overlap each other to an entire pixel area of the two body segments.

Here, when it extracts the major joint information in the key pose, the program may detect at least one joint, the displacement of which between the extracted key poses is equal to or greater than a first threshold, as a major joint.

Here, when it counts the repetitive movements, the program may calculate a posture accuracy by comparing a dynamic change in a major joint in sequential key poses of the standard movement information with a dynamic change in the major joint in a corresponding user movement, and may count the user movement as a repetitive movement when the user movement sequentially matches the key poses based on the posture accuracy.

Here, the program may acquire the user movement image stream captured by a camera simultaneously with outputting the demonstration movement image stream, acquire at least one image frame capturing a user movement during a predetermined time interval before and after the time at which each key pose in the demonstration movement image stream is output, and calculate the posture accuracy based on dynamic changes in major joints in the acquired image frame.

Here, when it calculates the posture accuracy, the program may calculate the posture accuracy based on an angle between a first displacement vector of the major joint in the sequential key poses of the standard movement information and a second displacement vector of the major joint in the sequential poses of the user movement corresponding to each of the sequential key poses of the standard movement.

Here, when it calculates the posture accuracy, the program may assign a higher posture accuracy score as the angle between the first displacement vector and the second displacement vector is smaller.

Here, when it calculates the posture accuracy, the program may calculate a final posture accuracy score using the average of posture accuracy scores for multiple major joints.

Here, when it counts the user movement as the repetitive movement, the program may trigger counting of repetitive movements when all of the posture accuracy scores of sequential poses of the user movement corresponding to the sequential key poses of the standard movement are equal to or greater than a second threshold.

A method for counting repetitive movements based on AI according to an embodiment may include generating standard movement information including a key pose extracted from a demonstration movement image stream based on human skeleton information, which is a set of pieces of positional information of human joints, and major joint information in the key pose and counting repetitive movements depending on whether a user movement matches the standard movement information based on human skeleton information of a user movement image stream.

Here, generating the standard movement information may include extracting a candidate pose, the distance of which from an anchor pose, which is a ready position, is equal to or greater than an upper limit threshold or is equal to or less than a lower limit threshold, as the key pose.

Here, extracting the candidate pose as the key pose may comprise calculating the distance based on a proportion of a pixel area in which a body segment of the candidate pose and a body segment of the anchor pose do not overlap each other to an entire pixel area of the two body segments.

Here, generating the standard movement information may include detecting at least one joint, the displacement of which between the extracted key poses is equal to or greater than a first threshold, as a major joint.

Here, counting the repetitive movements may include calculating a posture accuracy by comparing a dynamic change in a major joint in sequential key poses of the standard movement information with a dynamic change in the major joint in a corresponding user movement; and counting the user movement as a repetitive movement when the user movement sequentially matches the key poses based on the posture accuracy.

Here, counting the repetitive movements may comprise acquiring the user movement image stream captured by a camera simultaneously with outputting the demonstration movement image stream, acquiring at least one image frame capturing a user movement during a predetermined time interval before and after the time at which each key pose in the demonstration movement image stream is output, and calculating the posture accuracy based on dynamic changes in major joints in the acquired image frame.

Here, calculating the posture accuracy may comprise calculating the posture accuracy based on an angle between a first displacement vector of the major joint in the sequential key poses of the standard movement information and a second displacement vector of the major joint in the sequential poses of the user movement corresponding to each of the key sequential poses of the standard movement.

Here, calculating the posture accuracy may comprise assigning a higher posture accuracy score as the angle between the first displacement vector and the second displacement vector is smaller.

Here, calculating the posture accuracy may comprise calculating a final posture accuracy score using an average of posture accuracy scores for multiple major joints.

Here, counting the user movement as the repetitive movement may comprise triggering counting of repetitive movements when all of the posture accuracy scores of the sequential poses of the user movement corresponding to the sequential key poses of the standard movement are equal to or greater than a second threshold.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
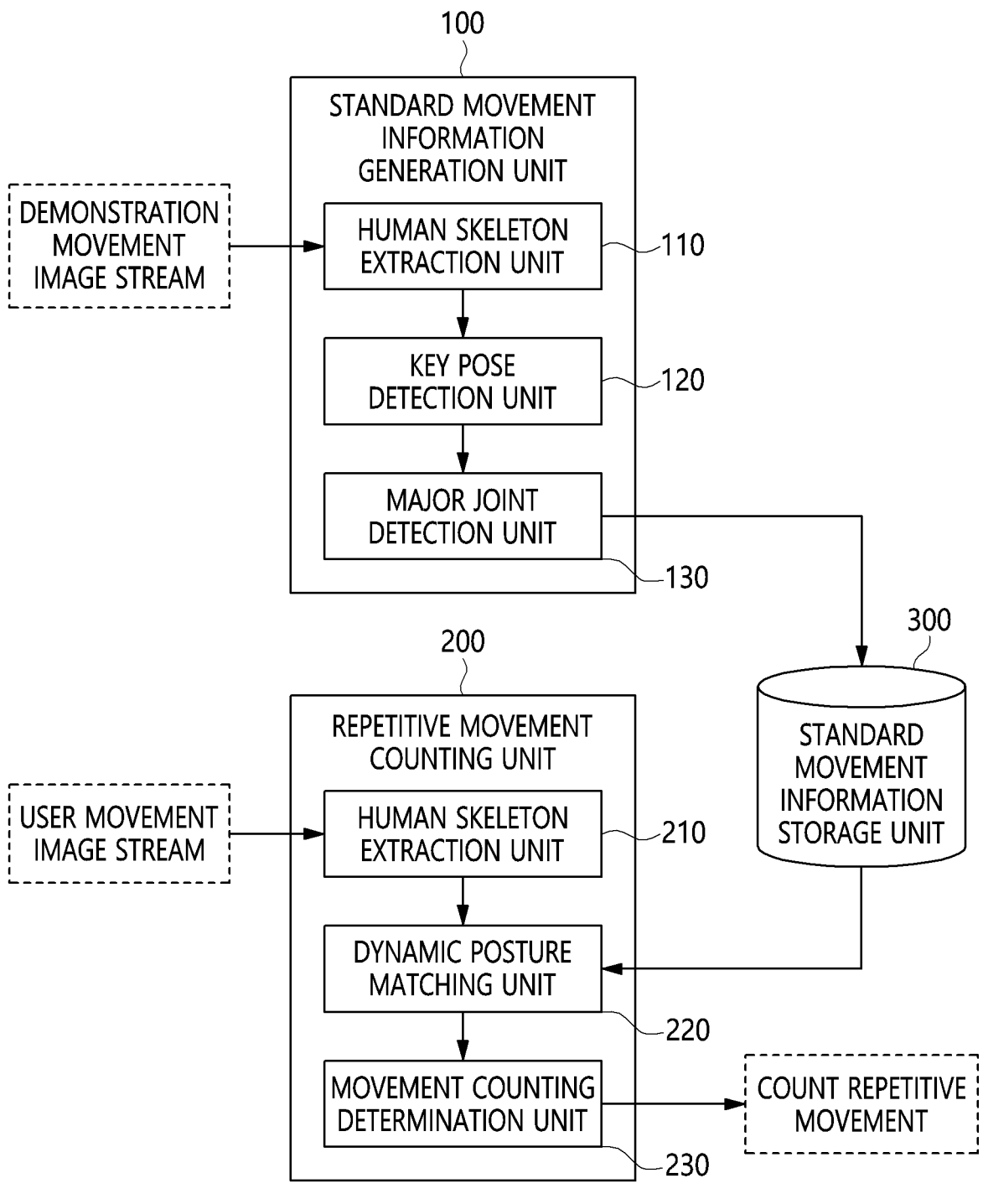
FIG. 1 is a schematic block diagram of an apparatus for counting repetitive movements based on AI according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

FIG. 1 is a schematic block diagram of an apparatus for counting repetitive movements based on AI according to an embodiment.

Referring to FIG. 1, the apparatus for counting repetitive movements based on AI according to an embodiment may include a standard movement information generation unit 100 and a repetitive movement counting unit 200.

The standard movement information generation unit 100 may generate standard movement information including a key pose extracted from a demonstration movement image stream based on human skeleton information, which is a set of pieces of positional information of human joints, and major joint information in the key pose.

Here, the demonstration movement image stream may be images capturing fitness movements to be performed by a user, and may be images capturing a demonstration fitness movement performed once by a user or video acquired in advance from YouTube or the like.

The standard movement information is compared with the movement performed by the user, thereby being used as ground truth for evaluating the accuracy of the movement of the user and for counting repetitive movements. That is, not the entire demonstration movement image stream but distinguishing key information extracted therefrom is the target to be compared.

The apparatus for counting repetitive movements based on AI according to an embodiment may further include a standard movement information storage unit 300. Accordingly, the human skeleton information, the key pose information, and the major joint information pertaining to a standard movement, which are extracted by the standard movement information generation unit 100, are stored in the standard movement information storage unit 300.

The repetitive movement counting unit 200 may count repetitive movements depending on whether the user's movement matches the standard movement information based on the human skeleton information of a user movement image stream.

That is, the repetitive movement counting unit 200 counts repetitive movements in the user movement image stream based on the standard movement information stored in the standard movement information storage unit 300.

Specifically, the standard movement information generation unit 100 may include a human skeleton extraction unit 110, a key pose detection unit 120, and a major joint detection unit 130.

The human skeleton extraction unit 110 estimates a pose in order to collect human skeleton information, which is a set of pieces of positional information of joints of a human appearing in the demonstration movement image stream acquired using a camera.

The key pose detection unit 120 automatically detects a key pose, which is a different key posture for counting, by analyzing the demonstration movement image stream based on the human skeleton information extracted by the human skeleton extraction unit 110.

Figure 2:
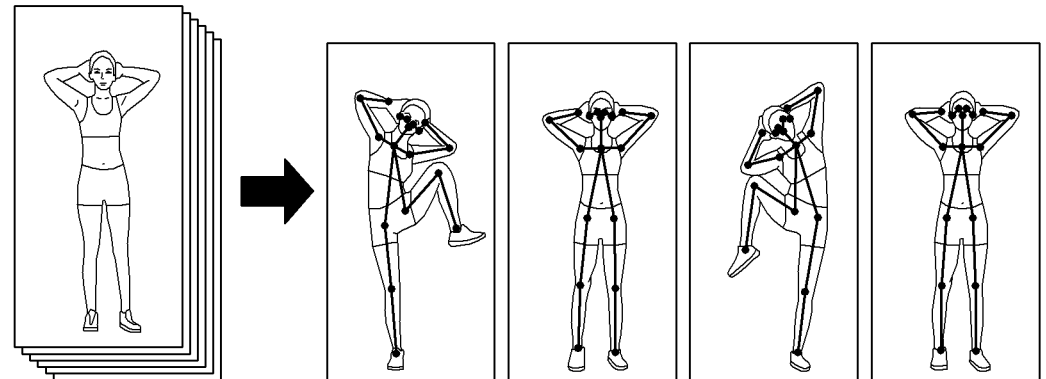
FIG. 2 is an exemplary view of key poses extracted from time-series standard movement data according to an embodiment.
Figure 3:
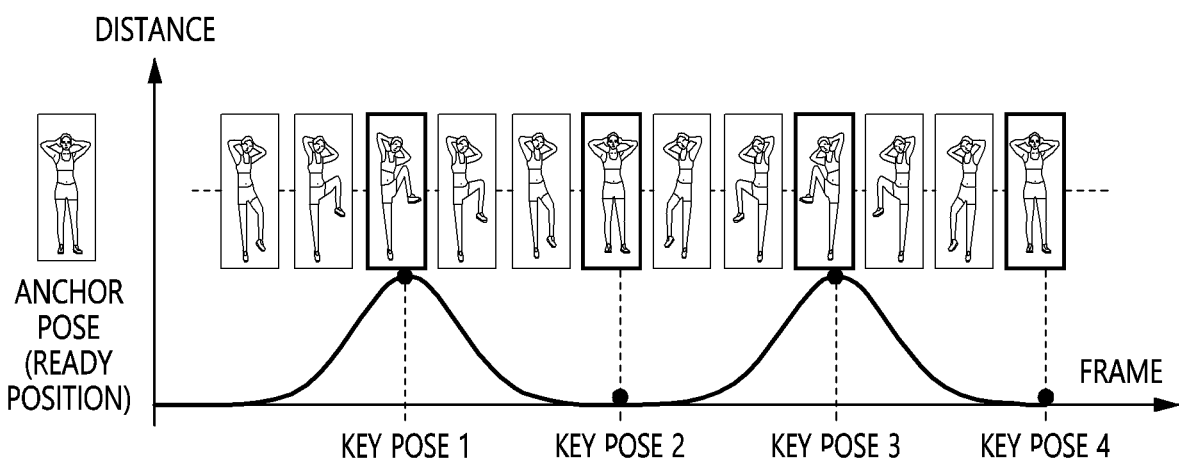
FIG. 3 is an exemplary view illustrating a distance from an anchor pose of time-series demonstration movement data according to an embodiment.
Figure 4:
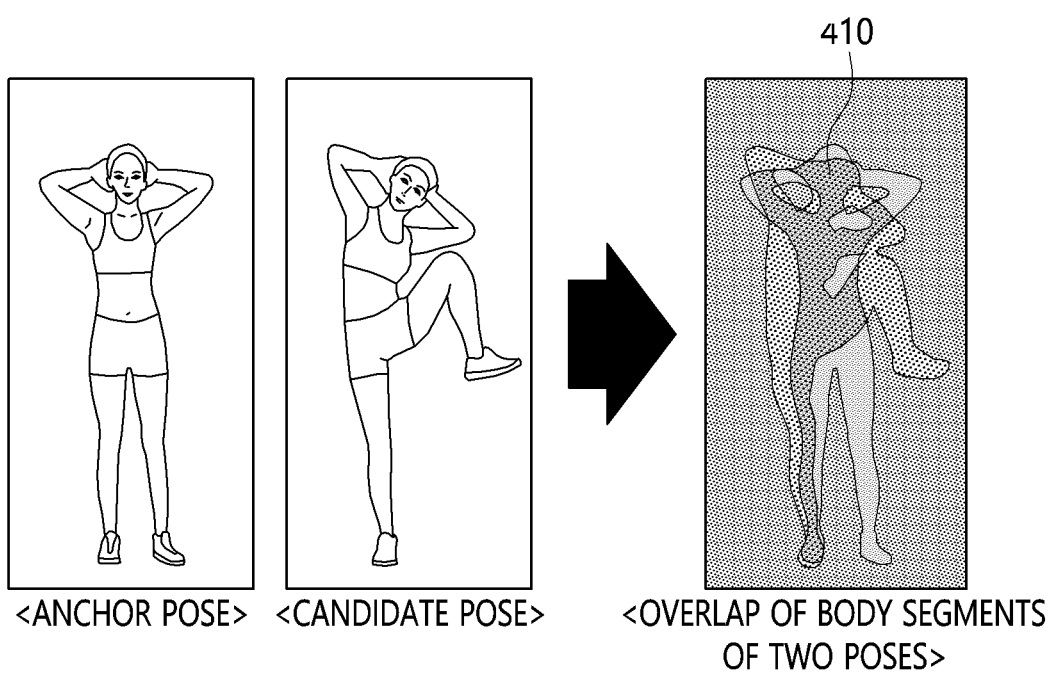
FIG. 4 is an exemplary view for explaining calculation of a difference between an anchor pose and a candidate pose based on body segments according to an embodiment.

FIG. 2 is an exemplary view of key poses extracted from time-series standard movement data according to an embodiment, FIG. 3 is an exemplary view illustrating a distance from an anchor pose of time-series demonstration movement data according to an embodiment, and FIG. 4 is an exemplary view for explaining calculation of a difference between an anchor pose and a candidate pose based on body segments according to an embodiment.

Referring to FIG. 2, key poses selected based on the changes of postures in time-series demonstration movement data are illustrated.

In order to select the key poses illustrated in FIG. 2, the key pose detection unit 120 calculates a distance value between an anchor pose, which is a ready position, and each of candidate poses in image frames sequentially input as a demonstration movement video stream.

Subsequently, the key pose detection unit 120 may extract the candidate pose, the distance value of which from the anchor pose, which is the ready position, is equal to or greater than an upper limit threshold or is equal to or less than a lower limit threshold, as a key pose.

That is, postures that are most different from the anchor pose, that is, postures having a distance value equal to or greater than the upper limit threshold, i.e., key pose 1 and key pose 3 in FIG. 2, may be selected as the key poses. Also, postures that are most similar to the anchor pose, that is, postures having a distance value equal to or less than the lower limit threshold, i.e., key pose 2 and key pose 4 in FIG. 2, may be selected as the key poses.

This embodiment is a method designed based on a characteristic that most fitness movements have a pattern of starting from a ready position, fully extending a body part, and going back to the ready position, and has an advantage in that it can be applied to all fitness movements performing repetitive movements.

Meanwhile, when it calculates the distance value from the anchor pose, which is a ready position, the key pose detection unit 120 may calculate the distance value based on the proportion of a pixel area in which the body segment of the candidate pose and the body segment of the anchor pose do not overlap each other to an entire pixel area including the two body segments.

Referring to FIG. 4, the key pose detection unit 120 extracts the body segment of the anchor pose and the body segment of the current pose. Then, when images of the extracted body segments of the two poses are superposed, the proportion of the pixels of body parts that do not overlap each other to the entire pixel area occupied by the two body parts is analyzed, whereby the distance between the anchor pose and the current pose is calculated. That is, the larger the pixel area that remains after excluding the area 410 in which the body segments of the two poses completely overlap each other from the entire area of the body segments of the two poses illustrated in FIG. 4, the greater the distance between the two poses.

As described above, fitness movements including stretching have a characteristic of trying to make the maximum effect of exercise by maximizing the range of movement. Accordingly, the embodiment in which a key pose is set to a pose where a body part moves to the maximum range of motion from the anchor pose may be a very simple and effective approach that considers the characteristic of the fitness movements.

The major joint detection unit 130 may detect at least one joint, the displacement of which between the extracted key poses is equal to or greater than a first threshold, as a major joint.

Figure 5:
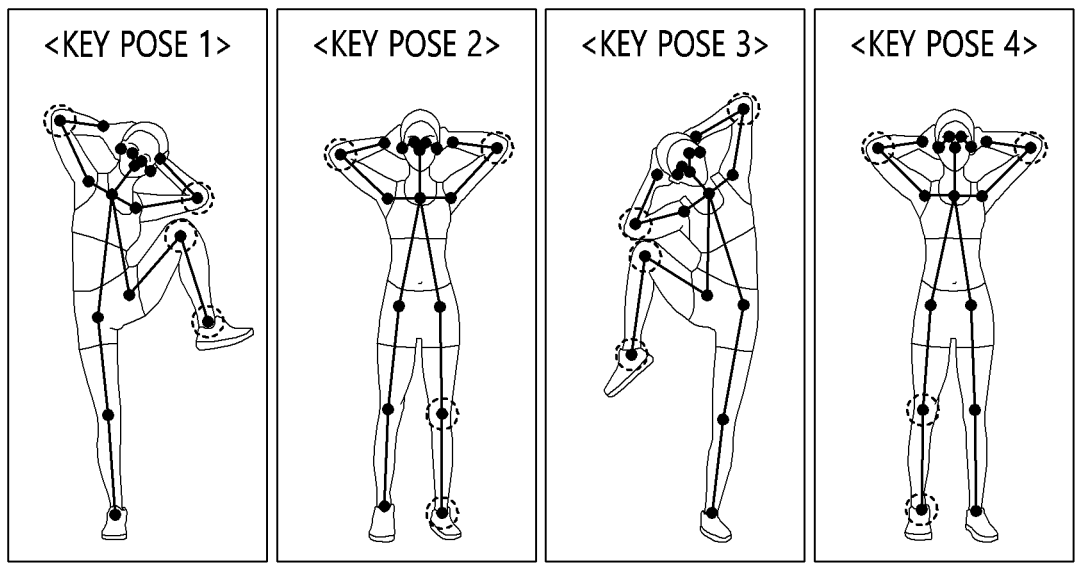
FIG. 5 is an exemplary view of major joints detected in each key pose according to an embodiment.

FIG. 5 is an exemplary view of major joints extracted for each key pose according to an embodiment.

Referring to FIG. 5, the positions of the same joints in key pose 1 and key pose 2 are compared with each other, and joints, the displacement of which is greater than a preset threshold, that is, joints corresponding to elbows, a knee, and an ankle marked with dotted circles, may be selected as the major joint of key pose 2.

This embodiment is based on the idea that, because respective fitness movements are intended to strengthen different body parts through exercise, it is necessary to select major joints corresponding to the body part targeted by the exercise and determine whether to count the movement by analyzing only the selected major joints in order to perform stable counting.

As described above, the standard movement information generation unit 100 according to an embodiment may automatically generate standard movement information using only a demonstration fitness movement performed once by a user or offline video acquired from YouTube or the like such that repetitive movements can be counted based thereon. Therefore, the embodiment is a differentiated method capable of being easily applied to various different movements without additional cost, unlike existing methods requiring a large number of training datasets and manually set prior information, and is advantageous in terms of scalability.

Referring again to FIG. 1, the repetitive movement counting unit 200 may include a human skeleton extraction unit 210, a dynamic posture matching unit 220, and a movement counting determination unit 230.

Here, the repetitive movement counting unit 200 may acquire a user movement image stream captured by a camera simultaneously with outputting a demonstration movement image stream. That is, when a fitness exercise begins, a user imitates the postures of the standard movement, which is a guide movement, thereby performing the movement.

The human skeleton extraction unit 210 receives the user movement image stream acquired by a camera and estimates poses in order to collect human skeleton information, which is a set of pieces of positional information of joints of a user appearing in the user movement images.

The dynamic posture matching unit 220 calculates a posture accuracy by comparing dynamic changes in major joints in the sequential key poses of the standard movement information with dynamic changes in the major joints in the corresponding user movement.

Figure 6:
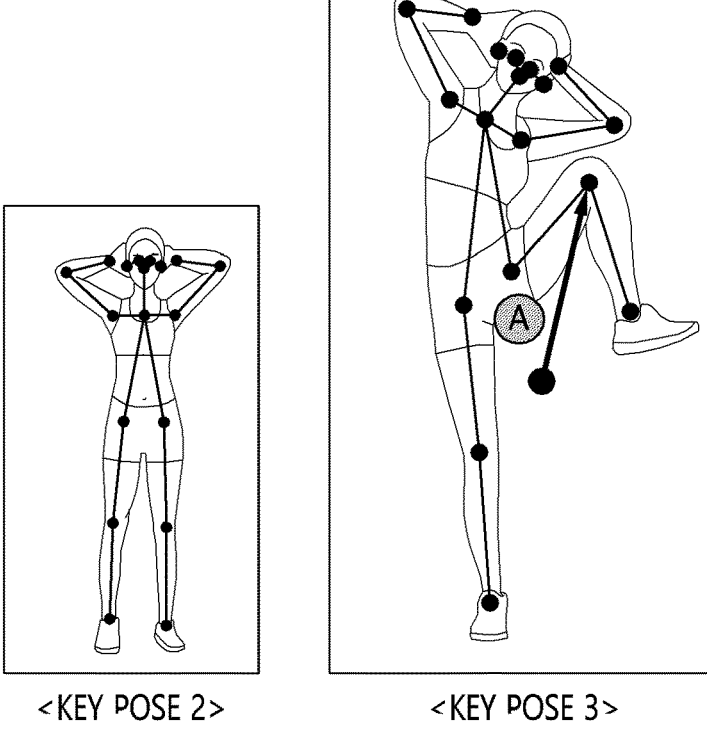
FIG. 6 is an exemplary view of a dynamic change in a major joint in key poses of standard movement information according to an embodiment.
Figure 7:
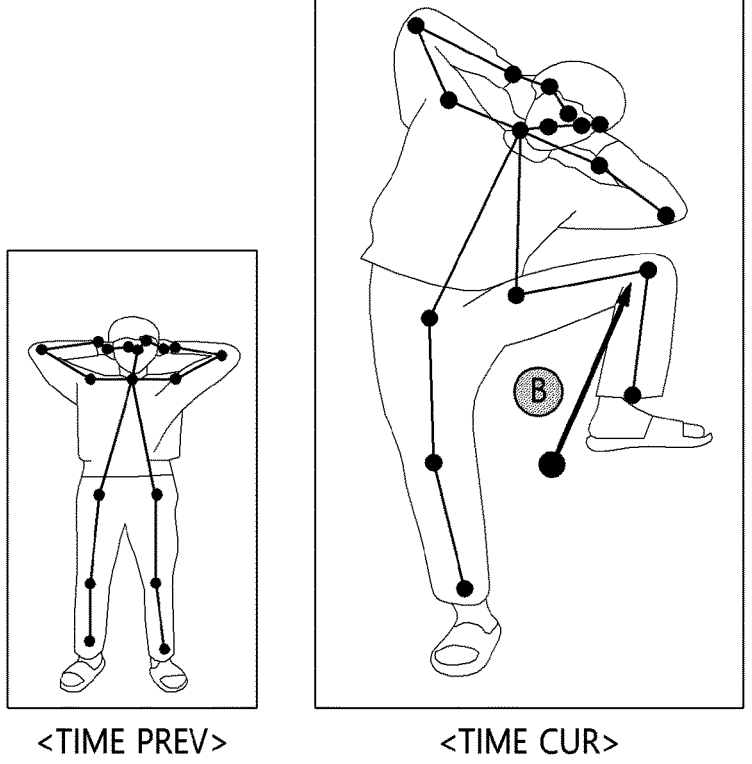
FIG. 7 is an exemplary view of a dynamic change in a major joint in a user movement according to an embodiment.
Figure 8:
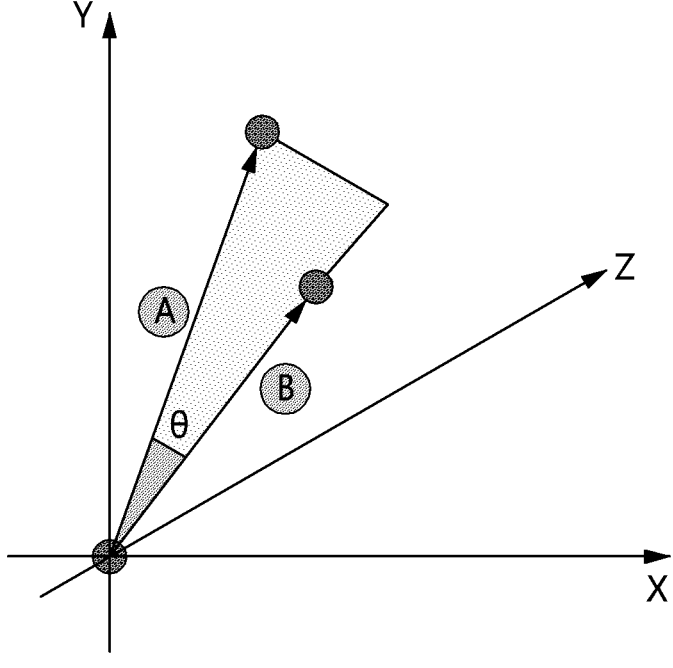
FIG. 8 is an exemplary view of comparison of dynamic changes in a major joint and measurement of the accuracy of the posture of a user according to an embodiment.

FIG. 6 is an exemplary view of dynamic changes in major joints in key poses of standard movement information according to an embodiment, FIG. 7 is an exemplary view of dynamic changes in major joints in a user movement according to an embodiment, and FIG. 8 is an exemplary view of comparison of dynamic changes in major joints and measurement of the accuracy of a posture of a user according to an embodiment.

That is, the dynamic posture matching unit 220 receives the skeleton information of the standard movement information such as that illustrated in FIG. 6 and the human skeleton information of a user such as that illustrated in FIG. 7 and compares dynamic changes in only the major joints, thereby evaluating the accuracy of the posture of the user.

Here, when a user movement image stream captured by a camera is acquired simultaneously with the output of the demonstration movement image stream, at least one image frame capturing the movement of a user during a predetermined time interval before and after the time at which each of the key poses in the demonstration movement image stream (i.e., the time interval of the key pose output time ±1 second) is output is acquired, and the accuracy of the posture may be calculated based on dynamic changes in the major joints in the acquired image frame.

Here, the dynamic posture matching unit 220 may calculate the accuracy of the posture based on the angle between a first displacement vector of the major joint in the sequential key poses of the standard movement information and a second displacement vector of the major joint in the sequential poses of the user movement corresponding to each of the sequential key poses of the standard movement.

That is, three-dimensional (3D) vector A (the first displacement vector) in the standard movement illustrated in FIG. 6 and 3D vector B (the second displacement vector) in the user movement illustrated in FIG. 7, each of which corresponds to the displacement of the left knee joint, which is the major joint, are compared with each other, whereby the accuracy of the posture is evaluated.

Referring to FIG. 8, 3D vector A indicates the displacement of the left knee joint in the standard movement of FIG. 6. For example, when the current standard movement is performance of key pose 3, the start point of vector A is the 3D position of the left knee joint in key pose 2, which is a previous key pose, and the end point of vector A is the 3D position of the left knee joint in key pose 3, which is the current key pose.

Similarly, 3D vector B indicates the displacement of the left knee joint in the user movement of FIG. 7. Here, the start point of vector B is the 3D position of the left knee joint of the user Δt before the current time, and the end point of vector B is the 3D position of the left knee joint of the user at the current time.

Here, Δt indicates the difference between the time at which the current key pose of the standard movement is performed and the time at which the previous key pose is performed. For example, when the time difference between key pose 2 and key pose 3 is 1.5 seconds, the start point of vector B may be the 3D position of the left knee joint of the user 1.5 seconds ago.

Here, 3D vector A and 3D vector B described above indicate the direction and distance of a dynamic change in the left knee in the standard movement and those in the user movement. The dynamic posture matching unit 220 sets the start points of vector A and vector B to the origin such that the start points of the two vectors match each other, as illustrated in FIG. 8, calculates the angle θ between vector A and vector B as the distance therebetween, as shown in Equation (1) below, and sets a score based on the distance between the two vectors.

$$\theta = \cos^{-1}\left(\frac{\overline{A} \cdot \overline{B}}{\|\overline{A}\| \; \|\overline{B}\|}\right) \tag{1}$$

Here, when the accuracy of the posture is calculated, a higher posture accuracy score may be assigned as the angle between the first and second displacement vectors is smaller. For example, the more similar the standard movement and the user movement for the left knee joint, the smaller the angle θ (=distance) between the two vectors, as illustrated in FIGS. 6 to 8, so the higher posture accuracy score may be assigned.

Here, when the accuracy of the posture is calculated, the final posture accuracy score may be calculated as the average of the posture accuracy scores for multiple major joints.

The method of matching the postures of movements according to this embodiment measures a dynamic change in the position of a user's joint based on the time consumed for movement between key poses, so it may operate regardless of the frame-processing speed (frames per second), which depends on the different computation capabilities of computing devices (a server, a desktop, a set-top box, a mobile terminal device, and the like). Also, because it is a method that focuses on the directionality of the dynamic movement of the joint, it has an advantage in which it is more robust to positional errors of joints than an existing static matching method that compares the positions and angles of respective joints.

The movement counting determination unit 330 triggers repetitive movement counting when a series of key poses is correctly performed in sequence.

Here, a movement may be counted as a repetitive movement only when all of the posture accuracy scores of the sequential poses of the user movement corresponding to the sequential key poses of the standard movement are equal to or greater than a second threshold.

However, according to another embodiment, counting a repetitive movement may be triggered when the number of user movements having a posture accuracy score equal to or greater than the second threshold, among the sequential poses of the user movement corresponding to the sequential key poses of the standard movement, is equal to or greater than a predetermined number.

Figure 9:
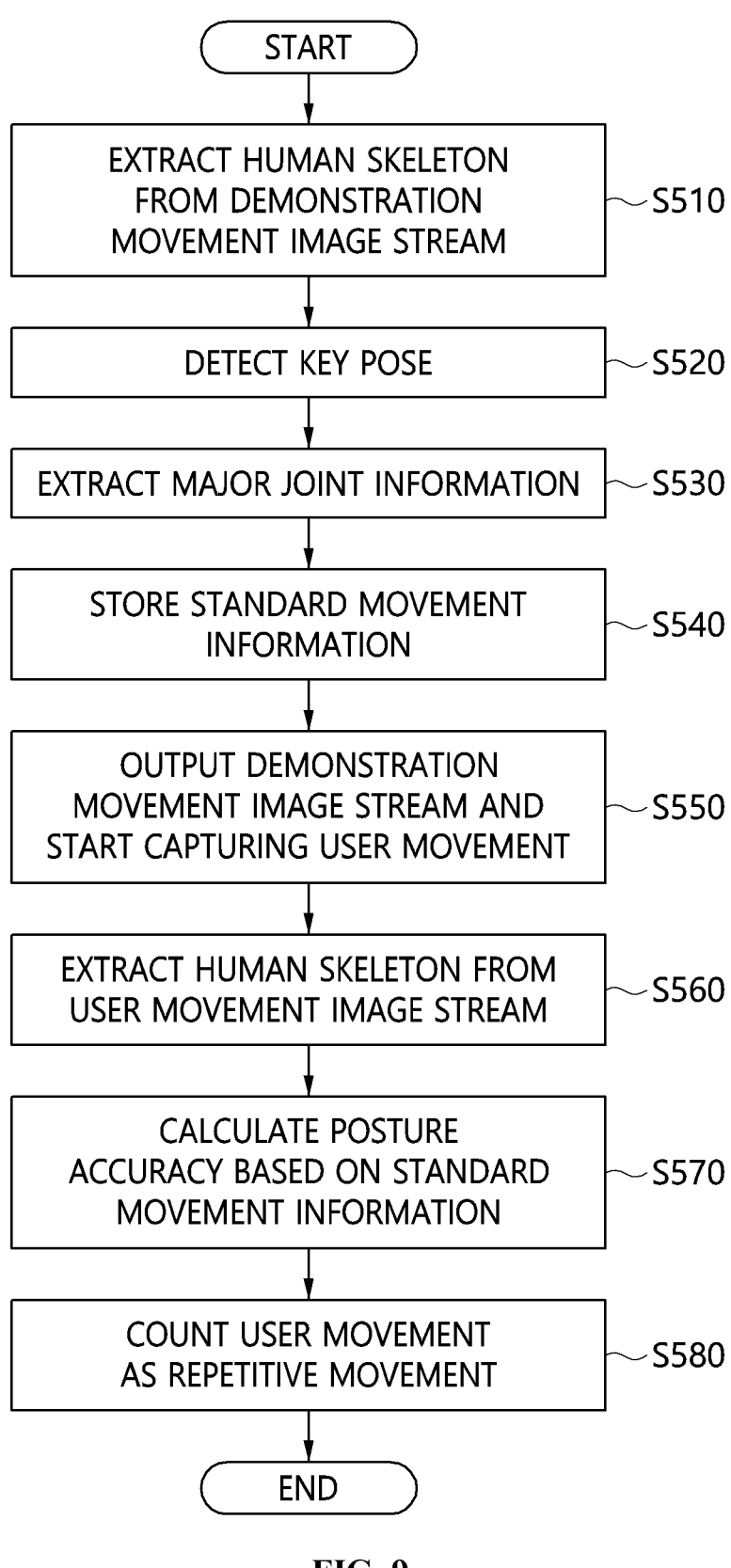
FIG. 9 is a flowchart for explaining a method for counting repetitive movements based on AI according to an embodiment.

FIG. 9 is a flowchart for explaining a method for counting repetitive movements based on AI according to an embodiment.

Referring to FIG. 9, the method for counting repetitive movements based on AI according to an embodiment may include generating standard movement information that includes a key pose extracted from a demonstration movement image stream based on human skeleton information, which is a set of pieces of positional information of human joints, and major joint information in the key pose at steps S510 to S530 and counting repetitive movements depending on whether a user movement matches the standard movement information based on human skeleton information of a user movement image stream at steps S550 to S580.

Here, generating the standard movement information at steps S510 to S530 may include extracting a candidate pose, the distance of which from an anchor pose, which is a ready position, is equal to or greater than an upper limit threshold or is equal to or less than a lower limit threshold, as a key pose at step S520.

Here, extracting the candidate pose as the key pose at step S520 may comprise calculating the distance based on the proportion of a pixel area in which the body segment of the candidate pose and the body segment of the anchor pose do not overlap each other to the entire pixel area of the two body segments.

Here, generating the standard movement information at steps S510 to S530 may include detecting at least one joint, the displacement of which between the extracted key poses is equal to or greater than a first threshold, as a major joint at step S530.

In the method for counting repetitive movements based on AI according to an embodiment, the standard movement information generated as described above may be stored in a database at step S540.

Here, counting the repetitive movements at steps S550 to S570 may include calculating a posture accuracy by comparing a dynamic change in the major joint in the sequential key poses of the standard movement information with a dynamic change in the major joint in the corresponding user movement at step S570 and counting the user movement as a repetitive movement when the user movement sequentially matches the key poses based on the posture accuracy at step S580.

Here, counting the repetitive movements at steps S550 to S570 may comprise acquiring the user movement image stream captured by a camera simultaneously with outputting the demonstration movement image stream at step S550, acquiring at least one image frame capturing a user movement during a predetermined time interval before and after the time at which each key pose in the demonstration movement image stream is output, and calculating the posture accuracy based on dynamic changes in the major joints in the acquired image frame.

Here, calculating the posture accuracy at step S570 may comprise calculating the posture accuracy based on the angle between a first displacement vector of the major joint in the sequential key poses of the standard movement information and a second displacement vector of the major joint in sequential poses of the user movement corresponding to each of the key sequential poses of the standard movement.

Here, calculating the posture accuracy at step S570 may comprise assigning a higher posture accuracy score as the angle between the first displacement vector and the second displacement vector is smaller.

Here, calculating the posture accuracy at step S570 may comprise calculating the final posture accuracy score using the average of the posture accuracy scores for multiple major joints.

Here, counting the user movement as a repetitive movement at step S580 may comprise triggering counting of repetitive movements when all of the posture accuracy scores of the sequential poses of the user movement corresponding to the sequential key poses of the standard movement are equal to or greater than a second threshold.

Figure 10:
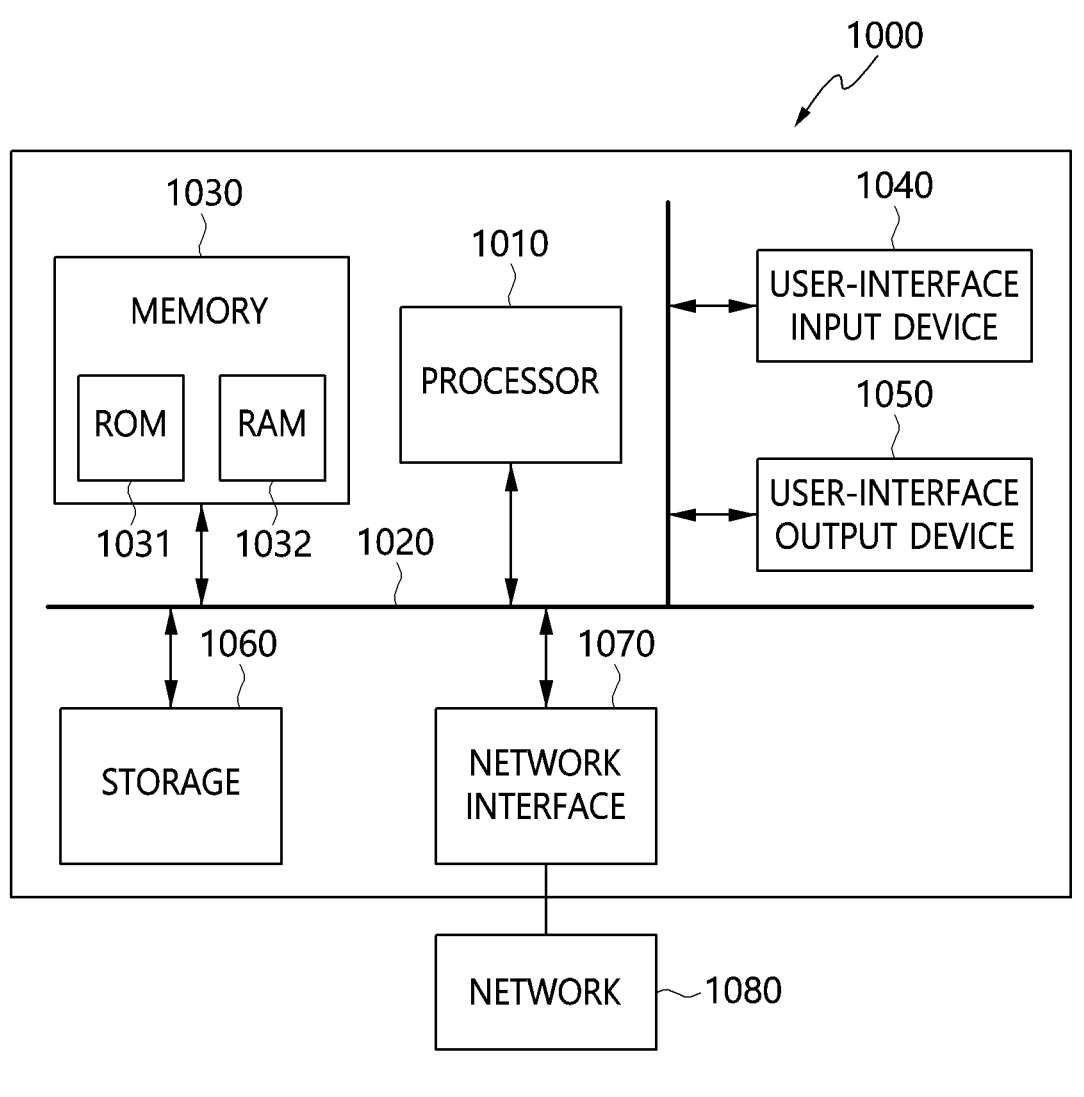
FIG. 10 is a view illustrating a computer system configuration according to an embodiment.

FIG. 10 is a view illustrating a computer system configuration according to an embodiment.

The apparatus for counting repetitive movements based on AI according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, repetitive movements may be automatically counted using a demonstration fitness movement performed once by a user (or demonstration video acquired in advance from YouTube, or the like), without a number of training datasets or manually set prior information.

According to the disclosed embodiment, problems of the cost and effort for performing training for which collecting large amounts of training datasets in advance is required in order to train a deep-learning model for counting repetitive movements may be solved.

According to the disclosed embodiment, problems of manpower and uncertainty that are caused by manually setting in advance angles formed by major segments for each standard posture, which is a criterion for counting repetitive movements, may be solved.

The disclosed embodiment is a differentiated method capable of being easily applied to various movements without additional cost and is very superior in scalability.

Although the embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for counting repetitive movements based on Artificial Intelligence (AI), comprising:
    memory in which at least one program is recorded; and
    a processor for executing the program,
    wherein:
    the program generates standard movement information including a key pose extracted from a demonstration movement image stream based on human skeleton information, which is a set of pieces of positional information of human joints, and major joint information in the key pose and counts repetitive movements depending on whether a user movement matches the standard movement information based on human skeleton information of a user movement image stream,
    wherein, when counting the repetitive movements, the program calculates a posture accuracy by comparing a dynamic change in a major joint in sequential key poses of the standard movement information with a dynamic change in the major joint in a corresponding user movement and counts the user movement as the repetitive movement when the user movement sequentially matches the key poses based on the posture accuracy,
    wherein, when calculating the posture accuracy, the program calculates the posture accuracy based on an angle between a first displacement vector of the major joint in the sequential key poses of the standard movement information and a second displacement vector of the major joint in the sequential poses of the user movement corresponding to each of the key poses of the standard movement information,
    wherein, when calculating the posture accuracy, the program assigns a higher posture accuracy score as the angle between the first displacement vector and the second displacement vector is smaller, and
    wherein, when calculating the posture accuracy, the program calculates a final posture accuracy score using an average of posture accuracy scores for multiple major joints.

2. The apparatus of claim 1, wherein, when detecting the key pose, the program extracts a candidate pose, a distance of which from an anchor pose, which is a ready position, is equal to or greater than an upper limit threshold or is equal to or less than a lower limit threshold, as the key pose.

3. The apparatus of claim 2, wherein, when calculating the distance, the program calculates the distance based on a proportion of a pixel area in which a body segment of the candidate pose and a body segment of the anchor pose do not overlap each other to an entire pixel area of the two body segments.

4. The apparatus of claim 1, wherein, when extracting the major joint information in the key pose, the program detects at least one joint, displacement of which between the extracted key poses is equal to or greater than a first threshold, as a major joint.

5. The apparatus of claim 1, wherein the program acquires the user movement image stream captured by a camera simultaneously with outputting the demonstration movement image stream, acquires at least one image frame capturing a user movement during a predetermined time interval before and after a time at which each key pose in the demonstration movement image stream is output, and calculates the posture accuracy based on dynamic changes in major joints in the acquired image frame.

6. The apparatus of claim 1, wherein, when counting the user movement as the repetitive movement, the program triggers counting of repetitive movements when all of accuracy scores of the sequential poses of the user movement corresponding to the sequential key poses of the standard movement information are equal to or greater than a second threshold.

7. A method for counting repetitive movements based on Artificial Intelligence (AI), comprising:
    generating standard movement information including a key pose extracted from a demonstration movement image stream based on human skeleton information, which is a set of pieces of positional information of human joints, and major joint information in the key pose; and
    counting repetitive movements depending on whether a user movement matches the standard movement information based on human skeleton information of a user movement image stream,
    wherein counting the repetitive movements includes:
    calculating a posture accuracy by comparing a dynamic change in a major joint in sequential key poses of the standard movement information with a dynamic change in the major joint in a corresponding user movement; and
    counting the user movement as the repetitive movement when the user movement sequentially matches the key poses based on the posture accuracy,
    wherein calculating the posture accuracy comprises calculating the posture accuracy based on an angle between a first displacement vector of the major joint in the sequential key poses of the standard movement information and a second displacement vector of the major joint in the sequential poses of the user movement corresponding to each of the key poses of the standard movement information, wherein calculating the posture accuracy comprises assigning a higher posture accuracy score as the angle between the first displacement vector and the second displacement vector is smaller, and wherein calculating the posture accuracy comprises calculating a final posture accuracy score using an average of posture accuracy scores for multiple major joints.

8. The method of claim 7, wherein generating the standard movement information includes extracting a candidate pose, a distance of which from an anchor pose, which is a ready position, is equal to or greater than an upper limit threshold or is equal to or less than a lower limit threshold, as the key pose.

9. The method of claim 8, wherein extracting the candidate pose as the key pose comprises calculating the distance based on a proportion of a pixel area in which a body segment of the candidate pose and a body segment of the anchor pose do not overlap each other to an entire pixel area of the two body segments.

10. The method of claim 7, wherein generating the standard movement information includes detecting at least one joint, displacement of which between extracted key poses is equal to or greater than a first threshold, as a major joint.

11. The method of claim 7, wherein counting the repetitive movements comprises acquiring the user movement image stream captured by a camera simultaneously with outputting the demonstration movement image stream, acquiring at least one image frame capturing a user movement during a predetermined time interval before and after a time at which each key pose in the demonstration movement image stream is output, and calculating the posture accuracy based on dynamic changes in major joints in the acquired image frame.

12. The method of claim 7, wherein counting the user movement as the repetitive movement comprises triggering counting of repetitive movements when all of posture accuracy scores of the sequential poses of the user movement corresponding to the sequential key poses of the standard movement information are equal to or greater than a second threshold.

* * * * *